Figure 1:
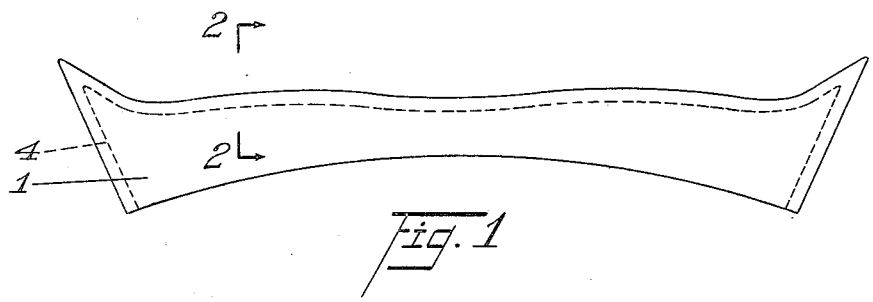

March 2, 1943. J. D. McBURNEY ET AL 2,312,925

SEMI-STIFF COLLAR AND METHOD OF PREPARING SAME

Filed June 7, 1937

John Dorman McBurney, INVENTORS
Edgar H. Nollau,
BY Frank C. Thlberg
ATTORNEY.

Patented Mar. 2, 1943

2,312,925

UNITED STATES PATENT OFFICE 2,312,925

SEMISTIFF COLLAR AND METHOD OF PREPARING SAME

John Dorman McBurney, Newburgh, N. Y., and Edgar Hugo Nollau, Wilmington, Del., assignors to E. I. du Pont de Nemours & Company, Wilmington, Del., a corporation of Delaware Application June 7, 1937, Serial No. 146,960

14 Claims. (Cl. 154—2)

This application is a continuation in part of our copending application Serial No. 5,078, filed February 5, 1935, now Patent No. 2,201,908.

This invention relates to wearing apparel of the type adapted to be subjected to repeated washings and more particularly to the stiffened portion of apparel such as collars, cuffs, and the like.

There are several types of fabric garments manufactured according to the present state of the art which are worn in the untreated state. For example, collars, cuffs, and the like having no stiffening agent. These have certain disadvantages with respect to appearance particularly when they become damp. It has long been customary to starch collars and similarly exposed portions to give them a temporarily stiffened condition. Collars so treated are satisfactory as far as initial appearance is concerned. However, when they become moist, they represent practically no advantage over the untreated collars.

Recently, it has been proposed to use a thermoplastic cement to coat or impregnate an interliner and subsequently to fuse the face and back ply thereto by means of heat and pressure. Collars so prepared depend almost entirely upon the selection of the impregnant for their suitability. A great many materials have been proposed for use in cementing the outer plies to the interliner. Among these are cellulose derivatives, rubber, and certain resins. Many of these materials have the disadvantage that a good bond between the plies is not maintained throughout the life of the collar, particularly after being subjected to 8 or 10 washing or commercial laundering operations. Some materials have been found which are more or less satisfactory from the standpoint of adhesion, but give the collar a very stiff or "boardy" feel, and for this reason are unsatisfactory. Other cementing media discolor and are not satisfactory for this reason. Still other expedients resorted to do not form a firm bond after a few washings and are not recemented when subjected to heat and pressure such as by ironing. Still other cements while more or less satisfactory from a standpoint of continued adhesion and "feel" must be considered unsatisfactory for the reason that they strike through the outer plies and give the collar an appearance similar to that which it would have if the adhesive were an oil or grease. The result is that as far as the applicants are aware, there are no commercially available cements on the market at the present time which are entirely satisfactory for the applicants' purpose.

Figure 2:
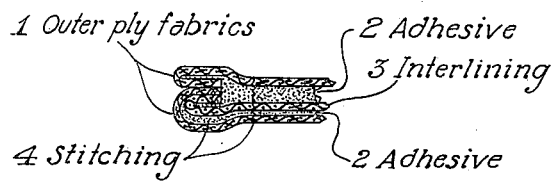
Figure 3:
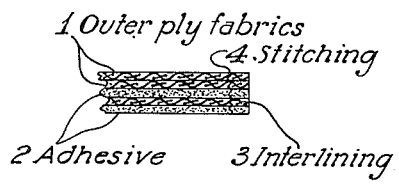
Figures 4, 5, 6:
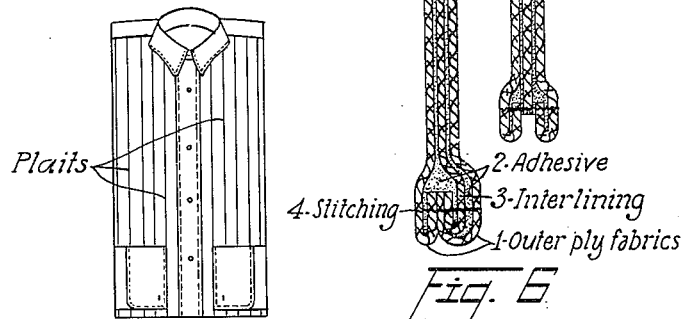

In the drawing, Figure 1 represents a plan view of a collar top prepared according to the present invention. Figure 2 represents a cross section along the line 2—2, in Figure 1, when Figure 1 is a three-ply collar. Figure 3 represents the assembly of the fabrics to which the thermoplastic adhesive has been applied before forming the collar. Figure 4 is a sketch of a finished shirt showing a collar, cuffs, and plaits embodying the present invention. Figure 5 represents a dress shirt in which the front and cuffs have been made semi-stiff by the invention herein disclosed. Figure 6 is a diagrammatic section through a collar in which the parts are enlarged showing the manner in which the plies are arranged and sewed into the interliner.

This invention has as an object the provision of a method of preparing semi-stiff collars, cuffs, and the like which are non-wrinkling, readily cleanable by washing, and are capable of retaining their shape and appearance after a considerable number of such washings.

Another object is the provision of a collar having two or more plies which after repeated washings and ironings do no show a "stitch pucker."

A further object is the production of collars which have the semi-stiff appearance and feel of starched collars. Other objects will appear as the description of the invention proceeds.

These objects are accomplished according to the present invention by laminating a plurality of plies of suitable design and weave for the manufacture of collars, cuffs, and the like by means of a cement which does not have the disadvantages of those mentioned above in connection with the prior art. The invention is more specifically carried out by coating or impregnating an interliner with a cement containing a plurality of resins of the type disclosed in our patent application Ser. No. 5,078, now Patent 2,201,908, as the only permanent film-forming ingredient of the cement and subsequently joining the outer plies thereto by means of heat and pressure. The following examples illustrate compositions which have been found suitable:

*Example 1*

An interliner was coated with the following composition:

| | Per cent |
|---|---|
| Polyvinyl acetate | 20.0 |
| Styrene | 20.0 |
| Methyl ethyl ketone | 30.0 |
| Ethyl acetate | 30.0 |
| | 100.0 |

This composition has a smooth milky-white appearance and is easily spread upon the interliner fabric. The solvent was allowed to evaporate and the plies were subsequently joined by means of heat and pressure the same as obtained by ironing with a moderately hot iron; that is, between 250° F. and 350° F. The milky appearance may be due to a slight incompatibility between the resins. This is not objectionable and in fact in some cases has the advantage that the finished collar has an appearance which more closely resembles a starched collar than when the resins form a clear solution. The adhesion is satisfactory and the incompatibility of the resins, if any, does not affect the bond.

Example 2

An interliner was coated with the following composition in the same manner as indicated in Example 1.

| | Per cent |
|---|---|
| Copolymer of vinyl acetate and vinyl chloride | 12.0 |
| Styrene | 28.0 |
| Methyl ethyl ketone | 18.0 |
| Ethyl acetate | 42.0 |
| | 100.0 |

This composition likewise had a smooth milky-white appearance and was easily spread on the interliner fabric.

Example 3

The following composition was used in the same manner as in the previous examples:

| | Per cent |
|---|---|
| Styrene | 28.0 |
| Polyvinyl acetate | 6.0 |
| Copolymer of vinyl acetate and vinyl chloride | 6.0 |
| Ethyl acetate | 51.0 |
| Methyl ethyl ketone | 9.0 |
| | 100.0 |

Example 4

The following composition was prepared and used in the same manner as indicated in the previous examples:

| | Per cent |
|---|---|
| Styrene | 16.0 |
| Polyvinyl chloride | 7.2 |
| Copolymer of vinyl acetate and vinyl chloride | 14.4 |
| Ethyl acetate | 40.3 |
| Acetone | 21.6 |
| | 100.0 |

Example 5

This composition is also prepared and used as indicated in the previous examples:

| | Per cent |
|---|---|
| Styrene | 23.3 |
| Polyvinyl acetate | 5.1 |
| Copolymer of vinyl acetate and vinyl chloride | 5.1 |
| Ethyl acetate | 42.6 |
| Methyl ethyl ketone | 7.5 |
| Ethylene glycol monoethyl ether methyl phthalate | 10.9 |
| Titanium oxide (barium base) | 5.5 |
| | 100.0 |

This composition represents one in which a maximum of solvent plasticizer is used. A collar prepared from an interliner coated with this material has a good appearance but is slightly more flexible than compositions containing less solvent plasticizer. There is also a slight tendency for the adhesive to strike through the outer plies and therefore a very closely woven face and back ply should be used.

Example 6

| | Per cent |
|---|---|
| Styrene | 23.3 |
| Polyvinyl acetate | 5.1 |
| Copolymer of vinyl acetate and vinyl chloride | 5.1 |
| Ethyl acetate | 50.8 |
| Methyl ethyl ketone | 7.5 |
| Ethylene glycol monoethyl ether methyl phthalate | 5.5 |
| Titanium oxide (barium base) | 2.7 |
| | 100.0 |

This example is similar to the previous one except that about half as much plasticizer is used and therefore it is more practical with outer plies of the customary weave.

Example 7

| | Per cent |
|---|---|
| Polymeric methyl acrylate | 14.0 |
| Copolymer of vinyl chloride and vinyl acetate | 12.0 |
| Ethyl acetate | 56.0 |
| Acetone | 18.0 |
| | 100.0 |

A collar was prepared using this composition in a manner similar to the previous examples. This composition gave a good bond and have a very good appearance.

Example 8

| | Per cent |
|---|---|
| Polymeric methyl methacrylate | 20.0 |
| Copolymer of vinyl acetate and vinyl chloride | 8.0 |
| Methyl ethyl ketone | 60.0 |
| Acetone | 12.0 |
| | 100.0 |

Collars prepared by bonding the plies with the above composition represent one of the applicants' preferred embodiments of the present invention. The collar so prepared gave excellent adhesion, good appearance, and a very desirable degree of stiffness without the use of plasticizer. It will also be noted that no pigment in this example is necessary.

Example 8A

| | Per cent |
|---|---|
| Polymeric methyl methacrylate | 18.75 |
| Polymeric methyl acrylate | 5.00 |
| Methyl ethyl ketone | 56.25 |
| Ethyl acetate | 20.00 |
| | 100.00 |

The methyl acrylate resin in this formula is the same as that in Example 7.

Example 9

| | Per cent |
|---|---|
| Polymeric methyl methacrylate | 18.4 |
| Polyvinyl chloride | 5.5 |
| Ethylene glycol monoethyl ether methyl phthalate | 8.3 |
| Methyl ethyl ketone | 55.0 |
| Ethyl acetate | 12.8 |
| | 100.0 |

Collars prepared using the above composition were very satisfactory as far as appearance, bond and flexibility are concerned. It will be noted that this example is similar to the previous one except that plasticizer is used. The resulting collar is somewhat more flexible than the previous example.

Example 10

| | Per cent |
|---|---|
| Polymeric methyl methacrylate | 18.4 |
| Ethylene glycol monoethyl ether methyl phthalate | 8.3 |
| Copolymer of vinyl acetate and vinyl chloride | 7.3 |
| Methyl ethyl ketone | 55.0 |
| Acetone | 11.0 |
| | 100.0 |

This composition is also very satisfactory and collars prepared from an interliner coated with it have very good appearance, laundry resistance, and "feel." Collars so prepared are similar to those of the previous example.

Example 11

| | Per cent |
|---|---|
| Polymeric methyl methacrylate | 16.1 |
| Styrene | 8.3 |
| Ethylene glycol monoethyl ether methyl phthalate | 7.8 |
| Methyl ethyl ketone | 48.5 |
| Ethyl acetate | 19.3 |
| | 100.0 |

Example 12

| | Per cent |
|---|---|
| Polymeric methyl methacrylate | 17.5 |
| Styrene | 9.0 |
| Methyl ethyl ketone | 52.5 |
| Ethyl acetate | 21.0 |
| | 100.0 |

Example 13

| | Per cent |
|---|---|
| Polymeric methyl methacrylate | 14.9 |
| Alkyd resin[1] | 10.5 |
| Methyl ethyl ketone | 44.8 |
| Toluol | 29.8 |
| | 100.0 |

[1] The alkyd resin used in this example has the following composition:

| | Per cent |
|---|---|
| Glyceryl phthalate | 35.0 |
| Soya bean oil | 35.0 |
| Toluol | 30.0 |

An interliner was coated with the above composition and outer plies joined thereto by means of heat and pressure as indicated in the previous examples.

Example 14

| | Per cent |
|---|---|
| Polymeric methyl methacrylate | 25.0 |
| Resin[1] | 12.5 |
| Toluol | 55.0 |
| Ethyl alcohol | 7.5 |
| | 100.0 |

[1] The resin used in this example is a condensation product of formaldehyde with an aromatic sulfonamid. The resin used in this example has a melting point of 65° C. A test prepared in which the plies were bonded together by means of the above composition shows excellent adhesion before and after repeated launderings. The color, appearance, and elasticity of the finished collar were also very good.

In all the above examples where a copolymer of vinyl acetate and vinyl chloride are used, it is understood tht the ratio of the chloride to the acetate may vary. An ordinary copolymer used contains about 87% vinyl chloride and 13.0% vinyl acetate although good results may sometimes be obtained by using as little as 60 parts of vinyl chloride to 40 parts of vinyl acetate as disclosed in our parent application.

In the above examples, it was indicated that the fusing may be carried out by ironing with a flat iron at a temperature between 250° F. and 350° F. In the actual tests, a temperature between 275° F. and 305° F. is ordinarily used. A time of dwell of 15 secs. on the first side and a time of dwell of 10 secs. on the second side represents the standard practice in testing the collars prepared according to the present invention. When subjected to the laundering tests, the collars are usually boiled for about 5 minutes in a 1% soap solution after which they are rinsed and again tested for bond strength. Collars which withstand the first laundering satisfactorily are usually subjected to further repetitions of the laundering operation to determine their resistance to normal washings.

If desired, a relatively small amount of heat setting resins may be added to the above compositions. In some cases this is useful where the other resins are not particularly resistant to laundering.

In combining the resins for use in the present invention, we prefer to blend them so that the resulting compositions when free from volatile solvents have a softening point between about 225° F. and 300° F., some compositions having a softening point below 225° F. yield very satisfactory collars. However, it should not be so low that the plies separate to any great extent during the normal laundering operation.

It will be noted from the examples that the compositions contain primarily at least two resins together with solvent which subsequently evaporates.

In general, we prefer to use methyl methacrylate as one of the resins for the reason that it is thermoplastic, withstands repeated launderings, is colorless, and is readily softened by heat and pressure to the extent that the plies are resealed with considerable ease. The other resin or resins are usually those which have a lower softening point. However, only sufficient of the softer resins should be used to yield a cement which imparts to the finished collar the desired degree of pliability without allowing the resin to strike through the outer fabrics when subjected to normal ironing temperatures; that is, between 250° F. and 350° F. If too much of the softer resins are used, the permanency of the bond will be affected.

It has also been found in some cases an advantage to use a plurality of resins having relatively high softening points, together with a small amount of plasticizer, although this has not been found to be as satisfactory as two thermoplastic resins the combination of which has a softening point in the preferred range without the use of plasticizer.

In other cases, it has been found that a comparatively small amount of a heat setting resin such as the urea formaldehyde or the phenol formaldehyde resins may be used.

It will also be apparent that when an outer or back ply is selected which has a very fine weave, the softening point of the cement may be lower than when the outer plies are of a relatively loose weave. The collars according to the present invention are in general prepared in the same manner and from the same fabric as those indicated in our parent case of which this is a continuation in part.

It is to be understood that the cements and the modifications thereof herein disclosed are thermoplastic; that is, they become relatively soft and sticky at normal ironing temperatures even though small amounts of resins are included which are not per se thermoplastic.

It will further be apparent that pigments may be added if desired and nothing in this application is to be construed as meaning that any of the ingredients mentioned in our parent application are excluded from the present invention provided a plurality of resins are present. In the claims, the term permanent is intended to refer to ingredients which remain in the cement throughout the life of the collar. The resins, pigment and certain plasticizers are permanent. The volatile solvents are not.

It is to be understood that where the term plurality of resins is used, it is intended to be generic to mixtures of polymers, co-polymers, and interpolymers of similar or dissimilar monomers.

The term classes of resins is intended to be descriptive of the chemical structure of the monomer or polymer rather than of the physical characteristics. For example, the vinyls, methacrylates, alkyd, acrylates, aromatic sulfonamid formaldehydes, ureaformaldehydes, polyethers, and styrene each represent distinct classes of resins for the purpose of the present disclosure.

It is apparent that many widely different embodiments of this invention may be made without departing from the spirit and scope thereof; and, therefore, it is not intended to be limited except as indicated in the appended claims.

We claim:

1. A semi-stiff collar comprising a plurality of fabric plies firmly bonded together by means of a thermoplastic composition, said composition comprising a methyl methacrylate resin and a softer synthetic resin selected from the class consisting of vinyl, alkyd, and aromatic sulfonamid formaldehyde resins, and being free from oils and sufficiently flow-resistant at the temperature of boiling water to prevent the migration of the composition through the interstices of the outer plies, said collar being capable of withstanding repeated launderings and pressings.

2. A semi-stiff collar comprising a plurality of fabric plies firmly bonded together by means of a thermoplastic cement consisting of a methyl methacrylate resin and a softer synthetic resin selected from the class consisting of vinyl, alkyd, and aromatic sulfonamide formaldehyde resins, and being sufficiently flow-resistant at the temperature of boiling water to prevent the migration of the composition through the interstices of the outer plies, said collar being capable of withstanding repeated launderings and pressings.

3. In the process of preparing semi-stiff collars in which an interliner is coated with a thermoplastic composition, the improvement which comprises applying to the interliner a composition comprising a methyl methacrylate resin and a softer synthetic resin selected from the class consisting of vinyl, alkyd, and aromatic sulfonamide formaldehyde resins, and being free from oils and sufficiently flow-resistant at the temperature of boiling water to prevent the migration of the composition through the interstices of the outer plies, said collar being capable of withstanding repeated launderings and pressings.

4. Article of claim 1 in which one of the resins is methyl methacrylate and is present in predominating amount.

5. Article of claim 1 in which the composition retains its adhesive characteristic at the temperature of boiling water.

6. Process of claim 3 in which the thermoplastic composition contains polymeric methyl methacrylate in major proportion and a vinyl resin in minor proportion.

7. Process of claim 3 in which the thermoplastic compostiion contains polymeric methyl methacrylate in major proportion and an aromatic sulfonamid formaldehyde resin having a melting point of approximately 65° C. in minor proportion.

8. In the process of preparing semi-stiff collars wherein an interliner is coated with a thermoplastic cement and subsequently joined to an outer and back ply by means of heat and pressure, the improvement which comprises coating the said interliner with the following composition:

|  | Per cent |
|---|---|
| Polymeric methyl methacrylate | 20.0 |
| Copolymer of vinyl acetate and vinyl chloride | 8.0 |
| Solvent | 72.0 |
|  | 100.0 |

9. In the process of preparing semi-stiff collars wherein an interliner is coated with a thermoplastic cement and subsequently joined to an outer and back ply by means of heat and pressure, the improvement which comprises coating the said interliner with the following composition:

|  | Per cent |
|---|---|
| Polymeric methyl methacrylate | 25.0 |
| Aromatic sulfonamid formaldehyde resin | 12.5 |
| Solvent | 62.5 |
|  | 100.0 |

10. A multi-ply fabric for use in articles subjected to repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate and a copolymer of vinyl chloride and a vinyl ester of the lower aliphatic acids, said resins being blended in the mixture in proper proportions to acquire all of the said properties.

11. A multi-ply fabric for use in articles subjected to repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate and vinyl benzene, said resins being blended in the mixture in proper proportions to acquire all of the said properties.

12. The collar of claim 1 in which the thermoplastic composition contains polymeric methyl methacrylate in major proportion and a vinyl resin in minor proportion.

13. The collar of claim 1 in which the thermoplastic composition contains polymeric methyl methacrylate in major proportion and an aromatic sulfonamid formaldehyde resin having a melting point of approximately 65° C. in minor proportion.

14. A multi-ply fabric capable of withstanding repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate and a vinyl resin, said resins being blended in the mixture in proper proportions to acquire all of the said properties.

JOHN DORMAN McBURNEY.
EDGAR HUGO NOLLAU.

CERTIFICATE OF CORRECTION.

Patent No. 2,312,925.                          March 2, 1943.

JOHN DORMAN McBURNEY, ET AL.

It is hereby certified that error appears in the printed specification of the above numbered patent requiring correction as follows: Page 1, second column, line 24, for "no" read --not--; page 2, first column, line 55, for "40.3" read --40.8--; line 73, for "barius" read --barium--; and that the said Letters Patent should be read with this correction therein that the same may conform to the record of the case in the Patent Office.

Signed and sealed this 20th day of April, A. D. 1943.

Henry Van Arsdale, (Seal)                           Acting Commissioner of Patents.